May 13, 1969 H. WEISS 3,443,854
DIPOLE DEVICE FOR ELECTROMAGNETIC WAVE RADIATION IN
MICRON WAVELENGTH RANGES
Filed June 25, 1964

United States Patent Office 3,443,854
Patented May 13, 1969

3,443,854
DIPOLE DEVICE FOR ELECTROMAGNETIC WAVE RADIATION IN MICRON WAVELENGTH RANGES
Herbert Weiss, Nuremberg, Germany, assignor to Siemens Aktiengesellschaft, Erlangen, Germany, a corporation of Germany
Filed June 25, 1964, Ser. No. 377,800
Claims priority, application Germany, June 28, 1963, S 85,922
Int. Cl. G02b 5/30, 27/28, 5/20
U.S. Cl. 350—147
7 Claims

ABSTRACT OF THE DISCLOSURE

Dipole device for electromagnetic wave radiation below 1 mm. wavelength includes a carrier structure consisting of crystalline semiconductor material having poor electrical and magnetic conductivity and substantially transparent to wavelengths in the dipole-active range below 1 mm., the structure forming an incidence surface for the radiation, and a multitude of good conducting dipoles of less than 1 mm. length consisting of segregated anisotropic inclusions of the carrier material dispersed and embedded in the material and mutually spaced in parallel relation to each other, the carrier material and the anisotropic inclusions forming a eutectic of at least one system selected from the group consisting of binary and quasi-binary systems.

---

My invention relates to dipole devices for electromagnetic radiation below 1 mm. wavelength, such as polarized filters for optical radiation in the visible and infrared ranges of the spectrum.

The invention has for its objects to provide micron-wave dipole devices based on novel principles which afford an efficient polarized functioning at various wavelengths for which conventional dipole devices leave much to be desired, such as for use at infrared frequencies.

According to the invention a dipole device for electromagnetic wave radiation below 1 mm. wavelength, for example a polarized filter for micron waves consists of a carrier material of poor electrical conductivity, and forming an optical surface for incident radiation, and of a multitude of good conducting dipole rods having lengths less than 1 mm., or more particularly a length in the order of magnitude of the wavelengths of the electromagnetic radiation to be acted upon, the dipoles being dispersed and embedded in the carrier material and mutually spaced in parallel relation to each other.

The carrier material preferably consists of substance which is well permeable, i.e. transparent, to the wavelengths of the operative range below 1 mm., outside of the inherent absorption of the substance. For example, the carrier material may consist of semiconductor material which below the just-mentioned range of wavelengths, determined by the width of the forbidden zone of the particular material, is strongly absorptive but has low absorption at wavelengths above the range. Suitable are elemental semiconductor materials such as germanium and silicon, as well as $A^{III}B^V$ semiconductor compounds such as indium antimonide, indium arsenide and gallium antimonide, for example. However, insulating carrier materials, such as glass, are also applicable.

The embedded dipoles may consist of electrically conducting or ferromagnetic pieces of fine wire or filament material. Preferably employed, however, are dipoles formed of geometrically anisotropic segregations in form of minute needle-shaped inclusions produced, as segregations of a second phase, by oriented solidification of a melt containing a mixture of the carrier material and of the inclusion-forming substance, or produced separately and then distributed in the melt of the carrier material which is then caused to solidify under inclusion-orienting conditions.

Before dealing with the invention in further detail, the following explanation is in order. When an electrically conducting rod, constituting a dipole, is subjected to an electromagnetic alternating field, the dipole takes energy out of the field and radiates the energy toward all sides in directions perpendicular to the dipole longitudinal axis. However, this occurs only if the vector of the electrical field strength, or a component vector thereof, oscillates in parallel relation to the dipole axis and if the length of the dipole is approximately equal to that of the electrical wave and the dipole diameter considerably smaller than the wavelength. The wave travelling through or along the dipole thus loses some of its energy which is strayed out transversely to the direction of wave propagation.

On the other hand, when the vector of the electrical field strength oscillates perpendicularly to the dipole longitudinal axis, the attenuation of the wave passing through the dipole and the resulting stray emission of energy are very slight. When many such dipole rods are arranged parallel to each other to form a lattice or grid, an electromagnetic wave having its electrical field-strength vector oscillating parallel to the dipole axes is greatly attenuated as it passes through the lattice and will appear behind the lattice only with a greatly reduced, if not negligible, amplitude. Conversely, an electromagnetic wave whose electrical field-strength vector oscillates perpendicularly to the dipole axes, passes through the dipole lattice almost without reduction in amplitude.

A dipole device according to the invention utilizes the above-mentioned phenomenon. However, it will be understood from the foregoing that a dipole for wavelengths below the range of about 10 to about $50\mu$ must have extremely minute dimensions. That is, the diameter of the dipole rods should not be larger and preferably be smaller than about $1\mu$, and the length of the dipoles is preferably several microns and should not exceed the range of the wavelengths to be acted upon. For obtaining a polarizing lattice of dipoles, it is further necessary to have the dipoles oriented in parallel relation to each other and reliably secured in their respective positions. These conditions are met by a device according to the invention as outlined above and more fully described and exemplified hereinbelow.

One way of producing a dipole device according to the invention is as follows. Dipole rods of fine wire, such as a hair-like filament consisting of conducting material such as nickel or cobalt, are prepared by mechanical or chemical division of the filament, each dipole rod having a length as specified above. The dipoles are then embedded in a melt of the carrier material, for example molten glass, and are then oriented in parallel relation to each other before or during solidification of the melt. The orientation can be effected by gravity, by shaking, or preferably with the aid of an applied electrical or magnetical field.

It is of particular advantage, however, to produce a device according to the invention by forming a eutectic melt of a binary or quasi-binary system containing a semi-conductor substance and an addition substance which, when the semiconductor substance crystallizes, tends to segregate in the form of elongated rods or needles. The melt thus prepared is subsequently subjected to oriented solidification, such as normal freezing (gradual freezing from one end of the ingot to the other) or zone melting. It will be understood that the segregating second phase and the embedding material have no solid solubility relative to each other, although they are soluble or homogeneously miscible in the liquid state.

The method just described is in accordance with those disclosed for the production of other devices in Patent No. 3,226,225 of H. Weiss et al., for Electronic Semiconductor Devices and Method of Their Manufacture, and assigned to the assignee of the present invention. Reference to the copending application may be had for a variety of examples and details which are applicable also for the purposes of the present invention. However, in conjunction with the present invention, the following will be of interest.

Among the carrier materials suitable for a dipole device according to the invention are indium antimonide, gallium antimonide and germanium. So far, I have found it preferable to employ InSb, this substance being used in the examples of devices described hereinafter with reference to the accompanying drawings. When thus using InSb as a carrier material, rod or needle-shaped dipoles in form of segregated inclusions can be formed of Sb, $CrSb_2$, MnSb, NiSb or $FeSb_2$, for example. The necessary excess of material in elemental or compound form is added to the molten InSb, and the melt is then subjected to oriented solidification. When using GaSb, an excess of Sb results in the formation of suitable dipole inclusions. When using Ge as carrier material, an addition of Ni or Co results in the formation of conducting dipoles.

As a rule, the melt produced in each of these cases need only be given an accurately or substantially eutectic composition which, during freezing, results in the formation of the above-mentioned segregations in the form of anisotropic needle-shaped inclusions.

For example, a eutectic melt of InSb and NiSb is obtained by adding 1.8% by weight of NiSb to molten InSb. The melt is kept at 750 to 800° C. in a quartz boat for at least 1 hour to obtain a homogeneous liquid solution of the constituents. The homogeneous melt in then subjected to normal freezing at an advancing rate of 2.7 mm./min. The resulting solid ingot is then zone-melted at a zone travel rate of 1 min./min. The body of material thus obtained is cut into slices for use as infrared filters as exemplified on the accompanying drawing and described hereinafter. The method just described relates to InSb quantities of about 100 g.

It should be noted that NiSb crystallizes from InSb melts not in the strictly stoichiometric atom ratio of 1:1. Analyses have shown that the NiSb phase segregated in the above-described manner contains Sb in amounts from 49.1 to 53.2 atom percent rather than precisely 50%. This is in accordance with literature (M. Hansen and K. Anderke, Constitution of Binary Alloys, McGraw-Hill Book Company, 1958, page 1037) according to which nickel antimonide at room temperature exhibits a homogeneity range of 46.3 to 53% atom percent Sb. It will be understood therefore that strict stoichiometry with respect to the inclusions or embedding materials is not needed for the purposes of the present invention, as long as the dipole inclusion in the carrier material satisfy the conditions with respect to electrical and/or magnetic conductance, suitable lengths and diameter relative to the wave lengths of the electromagnetic radiation, and substantial parallelism of the dipoles.

A polarization filter with inclusions of InSb operates (in the infrared portion of the spectrum) on account of the fact that the electrical conductance of the inclusion is very much larger than that of the embedding carrier material. The specific electric conductance of intrinsically conducting InSb at room temperature (20° C.) is 220 (ohm-cm.)$^{-1}$, the corresponding specific conductance of NiSb is approximately $7 \cdot 10^4$(ohm-cm.)$^{-1}$.

Another eutectic composition suitable for the purposes of the invention can be formed at 195 g. InSb melted together with 5.0 g. $CrSb_2$ in an argon atmosphere at 700° C. After the melt has become homogeneous, it is subjected to normal freezing and thereafter zone melted several times at a rate of about 1 mm./min. Generally, the addition of $CrSb_2$ amounts to 2.5% by weight of the InSb.

When forming the device of germanium and nickel, a homogeneous melt containing 62 atom percent Ge and 38 atom percent Ni (melting point 775° C.) is permitted to freeze, and the ingot is then zone melted at 1.6 mm./min.

Another way of producing dipole devices according to the invention is to first produce anisotropic and preferably needle-shaped inclusions by segregation from the melt in the manner described above, and thereafter dissolve the conducting rod-shaped dipoles chemically from the carrier material. Applicable as solvents are those used and commercially available for germanium and the above-mentioned semiconductor compounds, such as a 1:1 mixture of nitric acid and hydrofluoric acid. As a result, a mass of individual dipoles of the desired dimensions is obtained; and the dipoles are then embedded, in lieu of the above-mentioned filament pieces, in the melt of another carrier substance, for example glass, in cases where the semiconductor or other original carrier material is less suitable as a carrier material in the ultimate device.

For further explanation, reference will be made to the accompanying drawings, in which.

Figure 1:
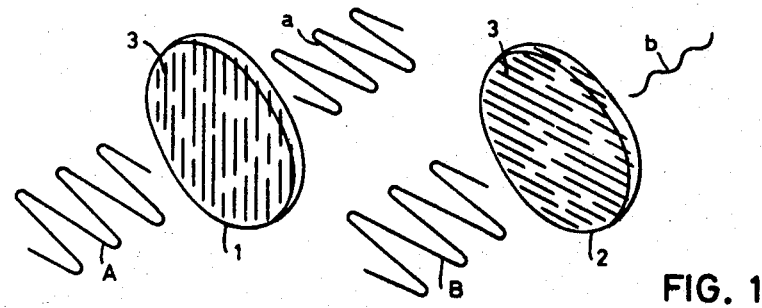
FIG. 1 shows schematically a filter device according to the invention with parallel dipoles in two different positions perpendicular to the wave plane and parallel thereto respectively.

FIG. 1 shows two flat and planar discs 1 and 2 consisting, for example, of indium antimonide in whose interior a multitude of rod-shaped dipoles 3, for example segregated inclusions of nickel antimonide, are embedded. The dipoles 3 are mutually spaced throughout the disc structure and their longitudinal axes are oriented in parallel relation to the disc planes. An electromagnetic alternating field polarized as shown at A passes nearly unweakened through the filter structure 1; that is the amplitude of the wave a behind the filter body is substantially as large as that of the radiation wave A entering into the filter. This applies to a positioning of the filter structure 1 with such an orientation of the dipoles 3 that they extend perpendicularly to the polarization plane of the wave A. In contrast thereto, when the orientation of the dipoles is parallel to the polarization plane of the radiation B, as is the case for the filter structure 2, the electromagnetic wave is greatly attenuated by the oriented dipoles 3 of the carrier structure 2 so that the amplitude of the wave b issuing from the filter is greatly reduced.

The NiSb dipoles in InSb, produced as segregations from a eutectic melt as described above, have a diameter of approximately $1\mu$ and lengths between 10 and $50\mu$. Since the mutual spacings of the dipoles exhibit static variations, there is no selective stray of a rotating wave in a preferred direction. This is confirmed by the curves shown in FIG. 2, which indicates on the ordinate the permeability (transparency) D in percent and on the abscissa the angle $\psi$ between the dipole axes and the magnetic vector in angular degrees. The five curves shown are identified along the right-hand border of the graph by their wave lengths $\lambda$ in microns. The filter disc used consisted of the above-described crystalline body of indium antimonide with 1.8% by weight of nickel antimonide.

The thickness of the disc was $71\mu$.

Figure 2:
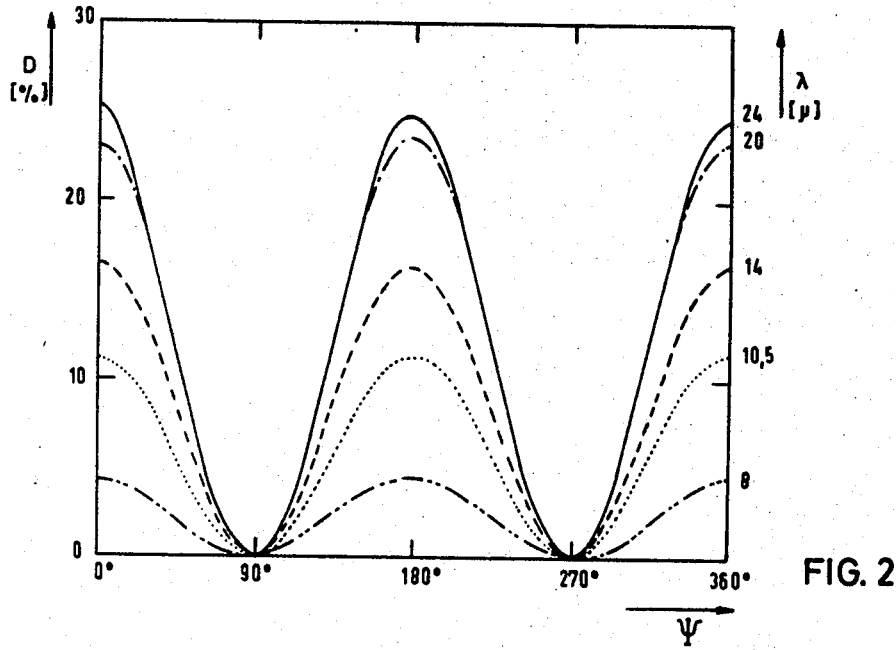
FIG. 2 is a graph of transparency curves relating to an indium antimonide filter containing nickel antimonide dipoles.

The curves shown in FIG. 2 for the respective wave lengths $\lambda$ of 24.0, 20.0, 14.0, 10.5 and $8.0\mu$ indicate the transparency of this filter in dependence upon the angle $\psi$. The curves show that the polarizing effect of the dipoles increases with an increase of the wave length from 8 to $24\mu$, and that virtually complete polarization is attained at $24\mu$. In the forward direction ($\psi=0°$ and 180°), the transparency increases with the wave length, whereas it fully disappears in the blocking direction ($\psi=90°$ and $270°$) so that the polarization degree attains the unity value.

Analogous results have been obtained with various other dipole devices according to the invention. For example, the polarization degree $$Q = \frac{D_{0°} - D_{90°}}{D_{0°} + D_{90°}}$$

of a filter formed of InSb with segregated dipole inclusions of CrSb increases from 0.10 at a wave length of $8\mu$ to about 0.58 at a wave length of $24\mu$.

InSb filters containing inclusions of $FeSb_2$ also exhibited pronounced polarization properties, an increase of transparency in the forward direction with the wave length, and a decrease of transparency in the blocking direction. The polarization degree was found to increase from 0.75 at a wave length of $8\mu$ to 0.96 at $24\mu$.

The effects relate to dipole devices of $71\mu$ thickness. The polarization degrees can be increased by increasing the filter thickness.

The above-given data were measured with dipole structures whose carrier body had sufficient thickness ($71\mu$) to be self-supporting, this being usually the case with small filters if their thickness is larger than $60\mu$. Since such dipole devices, although applicable without reinforcement, are fragile, it is preferable to mount them on a support consisting of substance that does not exhibit appreciable absorption in the range of wave lengths to be polarized. For the infrared filtering purposes mentioned above, and with particular reference to the InSb-NiSb combination described, a reinforcing plate of silicon is applicable to advantage. The reinforcing plate can be given a relatively large thickness, for example 0.3 mm., and then permits reducing the thickness of the dipole device proper. For example, a wafer of InSb+NiSb as described above, can thus be used with a thickness down to about $20\mu$. Such a wafer can be cut from a crystal and polished, then cemented to a silicon plate and further polished down to the ultimate thickness of about $20\mu$.

Figure 3:
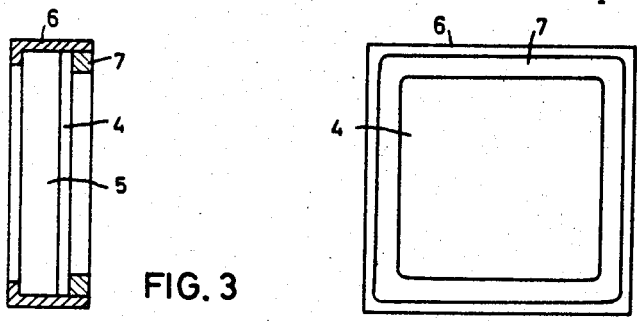
FIG. 3 is a sectional view and FIG. 4 a plan view of an infrared filter according to the invention.
Figure 4:
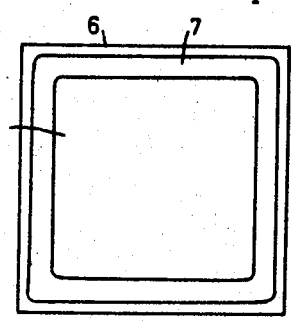

A filter of the kind just described is shown in FIGS. 3 and 4. The carrier and dipole structure proper is denoted by 4. It consists of the above-described InSb carrier material with dipole inclusions of NiSb and has a thickness of about $20\mu$. The dipole structure is backed and reinforced by a silicon plate 5 of approximately 0.3 mm. thickness, and both are placed into a frame 6 of metal and securely held therein by a fastening ring 7. The surface of the filter available for incident infrared radiation is approximately 10 mm.²

I claim:

1. Dipole device for electromagnetic wave radiation below 1 mm. wavelength, comprising a carrier structure consisting of crystalline semiconductor material having poor electrical and magnetic conductivity and substantially transparent to wavelengths in the dipole-active range below 1 mm., said structure forming an incidence surface for the radiation, and a multitude of good conducting dipoles of less than 1 mm. length consisting of segregated anisotropic inclusions of said carrier material dispersed and embedded in said material and mutually spaced in parallel relation to each other, said carrier material and said anisotropic inclusions forming a eutectic of at least one system selected from the group consisting of binary and quasi-binary systems.

2. Dipole device according to claim 1, wherein said carrier structure is plate-shaped, and said incidence surface is planar.

3. Dipole device according to claim 2, wherein said dipoles are needle-shaped and extend parallel to said incidence surface.

4. Dipole device according to claim 2, wherein said carrier structure is formed of indium antimonide, and said dipoles are needle-shaped and consist of nickel antimonide, said dipoles being between about 10 and 50 microns in length and approximately 17 microns in diameter.

5. Dipole device according to claim 2, including a planar supporting sheet of non-polarized material transparent to wavelengths in said dipole-active range below 1 mm., said carrier structure being in the form of a wafer of said crystalline semiconductor material and being in face-to-face engagement with said sheet to be supported thereby.

6. Dipole device according to claim 1 including a mechanically resistant support member having a front surface, said carrier structure being in the form of a wafer of said crystalline semiconductor material and being in face-to-face engagement with said front surface of said support member to be supported thereby.

7. In a filter device for infrared radiation according to claim 6, said supporting sheet consisting of silicon, said semiconductor material being indium antimonide, and said dipoles consisting of nickel antimonide.

References Cited

UNITED STATES PATENTS

| | | | |
|---|---|---|---|
| 2,224,214 | 12/1940 | Brown | 350—147 X |
| 2,281,100 | 4/1942 | Land. | |
| 2,954,349 | 9/1960 | Jenness | 350—1 X |
| 2,987,959 | 6/1961 | Kimmel. | |
| 2,992,425 | 7/1961 | Pratt | 350—147 X |
| 3,226,225 | 12/1965 | Weiss et al. | 252—6.3 X |

DAVID SCHONBERG, *Primary Examiner.*

P. R. MILLER, *Assistant Examiner.*

U.S. Cl. X.R.

350—1, 152, 320